Figure 1:
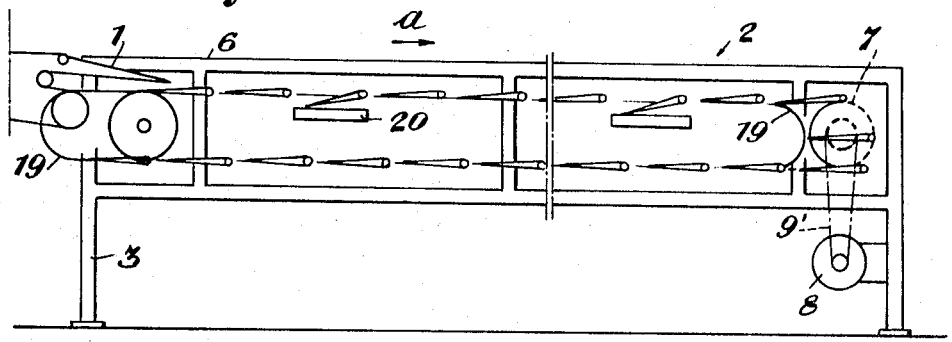

United States Patent

[11] 3,618,745

| [72] | Inventor | Antonio Dominici<br>8, Via Ruggero d'Andreotto, Perugia, Italy |
|---|---|---|
| [21] | Appl. No. | 12,379 |
| [22] | Filed | Feb. 18, 1970 |
| [45] | Patented | Nov. 9, 1971 |
| [32] | Priority | Feb. 18, 1969 |
| [33] | | Italy |
| [31] | | 35064A/69 |

[54] DISTRIBUTING DEVICE
7 Claims, 5 Drawing Figs.
[52] U.S. Cl. .................................................. 198/155
[51] Int. Cl. .......................................... B65g 15/00
[50] Field of Search ........................................ 198/155, 196, 146

[56] References Cited
UNITED STATES PATENTS

| 2,936,875 | 5/1960 | Von Kritter | 198/155 |
| 3,231,066 | 1/1966 | Harrison | 198/155 |

FOREIGN PATENTS

| 66,260 | 2/1948 | Denmark | 198/155 |

Primary Examiner—Richard E. Aegerter
Attorney—Browdy and Neimark

ABSTRACT: A series of downward tiltable trays are connected end-to-end to form a conveyor traveling over the feeders leading to the machines to which the load traveling on the trays is to be distributed. while means are provided to tilt the trays toward the feeders in order to transfer their load upon them, while a movement equal and contrary to that of the trays is imparted to the tray surface during said transfer.

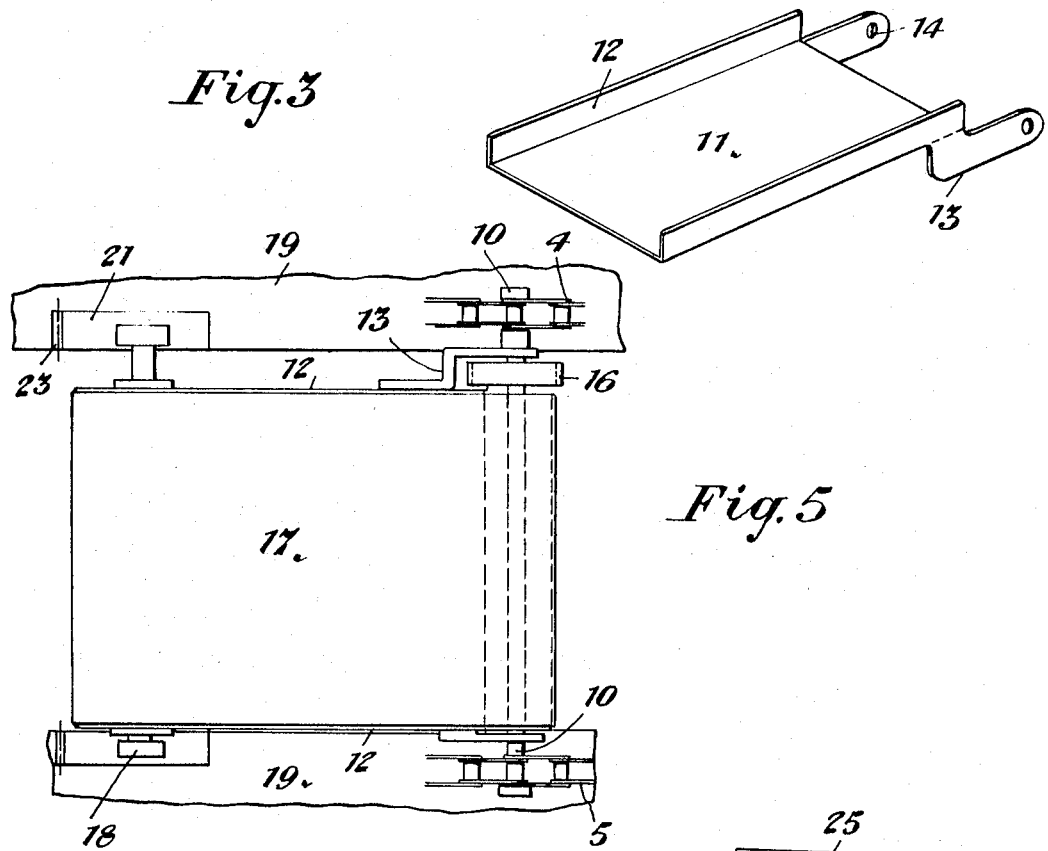
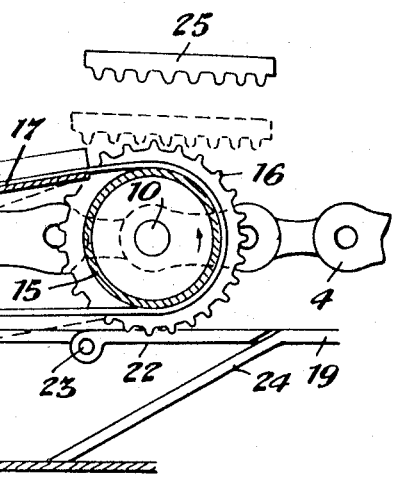
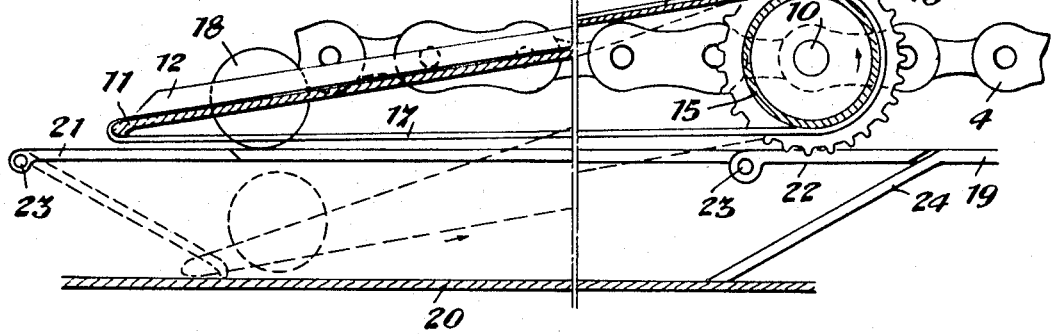

DISTRIBUTING DEVICE

The invention refers to conveyors, and more particularly to distributing conveyors.

As known, the conveyors of this type are inserted into production lines intermediate between two successive stations in order to distribute the output of a preceding station among subsequent stations or among groups of machines forming the subsequent station.

One object of the invention is to provide such a conveyor which is readily inserted into a production line and easily controllable either according to a preestablished program or by signals emitted by the stations. It is another object of the invention to provide a distributing conveyor which is capable to adapt the infeed of the products issuing from the preceding station to the operating cycles of the subsequent station or stations.

It is an additional object of the invention to supply a distributing conveyor which is capable of transferring the articles forming its load in the same order, arrangement or pattern in which they are transported by it.

It is a still further object of the invention to supply a conveyor which is even capable of safely handling easily damaged products, such as soft chocolate and candies, both during the transport upon it and during the process of transferring them to the feeders.

In order to attain these and other objects, the device of the invention essentially comprises a series of trays connected in an end-to-end relationship, carrying the output from the preceding station and moving above the feeders leading to the subsequent machines. Each individual tray is rotatably mounted, so as to be tiltable, independently of the others, towards any object of the feeders, in order to discharge its load upon them. This tilt is brought about by the action of organs controlled electrically, electronically, hydraulically or pneumatically, according to a program or by signals emitted by the machines of the line.

To attain the object of transferring the articles to the feeders and thus to the subsequent stations exactly in the same order, arrangement or pattern in which they are disposed on the tray surface, the latter is rendered movable. Simultaneously, to the surface of the tilting trays is imparted a motion whose speed is equal to that of the trays but whose direction is contrary to their direction or movement. Therefore, these two speeds annul each other and consequently the articles are deposited upon feeders at a zero speed, with the above-mentioned result of maintaining their original arrangement. Obviously, this effect is obtained if the feeder remains stationary during the transfer.

This measure also ensures that no heaping or damaging of the articles will occur during said transfer, so that, as stated, the present conveyor results to be particularly suitable for handling very soft goods.

Figure 2:
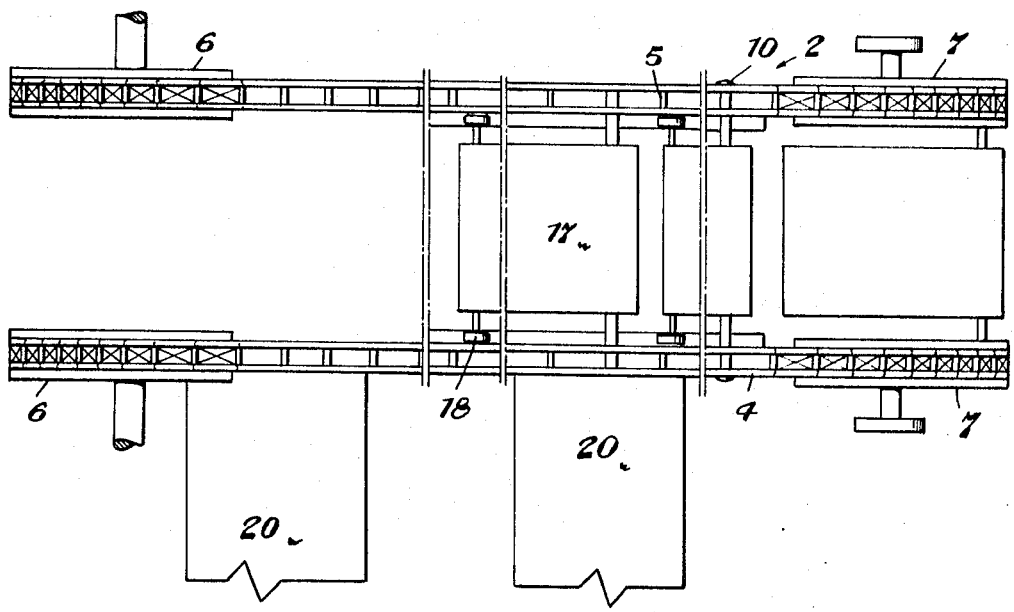

For a better understanding of the invention one of its possible embodiments will now be illustrated with reference to the attached drawings, wherein FIG. 1 is a schematic lateral view of the embodiment;
FIG. 2 is an enlarged schematic top view thereof;
FIG. 3 is a view of a tray component;
FIG. 4 is a lateral, partly sectional view of the tray;
FIG. 5 is a top view of the tray.

In the specification, the terms "right," "left," "top," "bottom," "clockwise" and "anticlockwise" are to be construed as seen in the figures, while the terms "forward," "backward" etc. are to be intended in the sense of the movements indicated by the arrows in the figures.

The device of the invention, generally indicated at 2 in FIGS. 1 and 2, is supported on a frame 3. The conveyor proper comprises two parallel endless sprocket chains 4 and 5, each running between two sprocket wheels 6 and 7, whose stub shafts are journaled at the two ends of frame 3. Both chains are driven in the direction of the arrow a by a motor 8 and a transmission 9.

The chains are interconnected by a number of spaced apart bars 10 whose opposite ends form, at each point of connection, the link pins of the chain plates.

The trays are represented in greater detail in FIGS. 3, 4 and 5. The rigid plate shown in FIG. 3 presents two lateral upturned flanges 12, and at its forward end two ears 13, having through holes 14 by which said plate is rotatably mounted on the bars 10. Also rotatable on the bars 10 is a cylinder 15 with a gear 16 fastened to one of its ends, coaxially with it, said cylinder and gear being mounted on bar 10 between the ears 13. Plate 11 and the cylinders 15 are rotatably on the bar shaft 10 independently of each other.

As shown in FIGS. 4 and 5, and endless belt 17 is looped tight around the trailing end of plate 11 and the cylinder 15 in frictional engagement with the latter, so that the cylinder, when rotated, will cause the movement of the belt.

Each tray is completed by two followers 18 projecting laterally from each side of plate 11, adjacently to its trailing end. By means of these two followers each tray rests and slides on guides 19 running parallel to the chains 4 and 5.

As shown in FIG. 1, the loaded trays on the driven, upper side of the conveyor pass above the transversal feed conveyors 20 leading to the machines of the subsequent station. Correspondingly to said feed conveyors, the followers glide over a downward tiltable pair of flaps 21 which are hinged in 22 to the guides 19 and form, as long as they are kept in their horizontal, inoperative position, a continuous surface with them, over which the trays pass without tilting. However, when the flaps are lowered around their hinges 22, their free end abuts against the underlying feeder to form inclined planes, along which the followers will descend upon the feeder surface. Thus, the tray will assume the tilted position shown in a dotted outline in FIG. 4. In this position the articles positioned on the belt 17 will be discharged upon the feeder, while the end of the tray is sliding across it.

At a distance from the pair of flaps 21, another pair of flaps 22 is provided in the guide surface 19. This pair is hinged to the guide 19 in 23, and also forms, in its horizontal position, a continuous surface with them. The flaps 22 are tiltable only in an upward sense. Underneath these flaps 22 a pair of inclined planes 24 leads from the feeder to the level of the guide surface. These inclined planes 24 will lead the followers, after their passage across the feeder, from the feeder surface back to the level of guide 19.

The downward tilt of flaps 21 to cause the discharge of the articles from the tray upon the feeder is obtainable by any convenient means. Such means can be actuated by signals emitted according a preestablished program and/or by the stations of the production line. Such means as well as the control systems for them are per se well known, their application to the flaps is a matter of routine and for this reason they are here neither described nor illustrated. No controls or actuating means are needed for flaps 22, which will return to their horizontal position by gravity after they have been lifted by the followers of the tray during its forward movement.

As already mentioned, in order to maintain the arrangement of the articles unaltered during their transfer from the tray to the feeder, and especially to prevent their forming heaps on the feeder during this transfer, the articles must be travel at a zero speed with respect to the feeder throughout the whole discharge. For this purpose, a stationary rack 25 is brought to mesh with the gear 16. The consequent anticlockwise rotation of the cylinder 15 will impart to the endless belt 17 the desired motion, which is equal but contrary to that of the tray, so that these two speeds will annul each other, and therefore the desired result will be obtained. Each rack 25 can be actuated by the same means and controls which govern the flaps 21. Obviously, to obtain the orderly transfer from belt 17 to feeder 20, the latter must remain stationary while the trailing end of the tray traverses its surface.

The trays can be kept approximately horizontal during their passage from the upper to the lower side of the conveyor, by connecting, at their two ends, the upper and the lower guides 19 by semicircular transitions, as shown in FIG. 1. Of course these transitions must have two guide surfaces, between which the followers will pass from the upper to the lower guides and vice versa.

In operation, the articles from the upstream station are discharged upon the trays of the distribution conveyor by any type of conveyor 1. The trays will transfer their load, in the manner described, to the feed conveyors 20 which, in this embodiment, are positioned at right angles with the distributing conveyor. It is easy to provide means to prevent the tray, which for some reason has been unable to discharge its load upon the feeders, from returning to the conveyor 1 with its surface still encumbered with its load, to receive an additional batch of articles. This would disturb the distribution. For this reason, a supplementary feed conveyor or hopper (not shown) can be provided after the last feed conveyor, upon which all trays could be tilted.

It is obvious that many changes and modifications could be brought to the present embodiment, without departing from the idea of the invention. Thus, the movement of the belt 17 could be obtained, in lieu of a rack 25 and pinion 16, in many other manners, and similarly the conformation and interconnection of the trays could be varied in order to adapt the distributing conveyor of the invention to special tasks.

I claim:

1. A conveyor for the distribution of the output of a station in a production line to units of a subsequent station, said conveyor comprising a plurality of trays to carry said output, interconnected in an end-to-end relationship and positioned above the feeders of the subsequent station, means to impart to said interconnected trays a continuous motion, means, positioned correspondingly to said feeders, to tilt the trays forward said feeders in order to discharge their load upon the latter, means to restore said trays to their untilted condition, said trays comprising a rigid plate means having ears at its forward end; a cylinder placed intermediate said ears; a gear fastened to one end of said cylinder, coaxially with it; a shaft passed through holes in said ears and said cylinder; and an endless belt looped tight around said cylinder and the trailing end of said plate to form the load carrying surface of said tray.

2. A conveyor as per claim 1, wherein the trays are interconnected by two parallel endless chains running between sprocket wheels, each end of the shaft of each tray forming the link pin of the chains at the point of connection between said shaft and said chains.

3. A conveyor according to claim 1, wherein the trays comprise laterally projecting followers placed adjacently their trailing portion.

4. A conveyor according to claim 3, comprising guide means for said followers running parallel to said chains.

5. A conveyor according to claim 4, wherein the means to tilt the trays toward the feed conveyors of the subsequent stations are flap means provided in said guides and positioned in the paths of said followers and which, from a horizontal position permitting the passage of said tray over them, are downwardly tiltable to a position inclined toward said feed conveyors thereby lowering the trailing portion of said trays upon said feed conveyor surface to transfer their load upon the latter.

6. A conveyor according to claim 4, wherein the means to restore said trays to their untilted position are upward inclined plates leading from the feed conveyor surface back to said guide means, and positioned in the path of the tray followers.

7. A conveyor according to claim 1, wherein, correspondingly to the feed conveyors, racks are provided to engage said gears during the tilt of the trays, thereby imparting to the belt forming the tray surface a motion whose speed is equal but whose direction is contrary to the speed and direction of the trays.

* * * * *

UNITED STATES PATENT OFFICE
CERTIFICATE OF CORRECTION

Patent No. 3,618,745　　　　　　　　　Dated November 9, 1971

Inventor(s)　Antonio DOMINICI

It is certified that error appears in the above-identified patent and that said Letters Patent are hereby corrected as shown below:

Please substitute the following figure for the figure which appears on the cover of the U.S. Patent above identified:

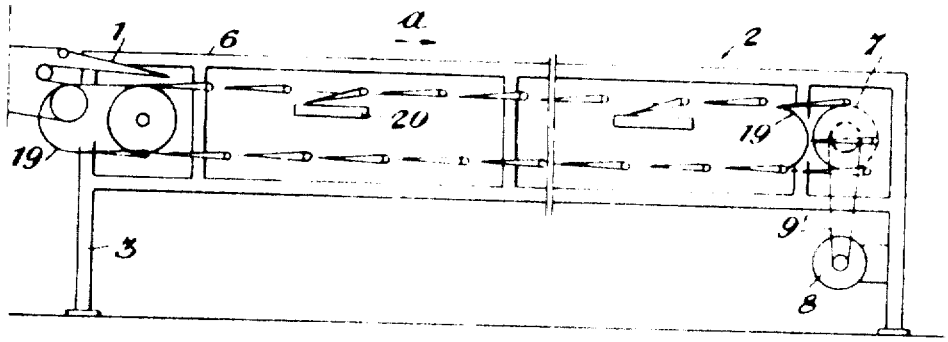

Signed and sealed this 30th day of January 1973.

(SEAL)
Attest:

EDWARD M. FLETCHER, JR.　　　　　　ROBERT GOTTSCHALK
Attesting Officer　　　　　　　　　Commissioner of Patents